United States Patent [19]

Gnyra

[11] 4,275,043
[45] Jun. 23, 1981

[54] REMOVAL OF OXALATE FROM BAYER PROCESS LIQUOR

[75] Inventor: Bohdan Gnyra, Kingston, Canada

[73] Assignee: Alcan Research and Development Limited, Montreal, Canada

[21] Appl. No.: 114,286

[22] Filed: Jan. 22, 1980

[30] Foreign Application Priority Data

Jan. 31, 1979 [GB] United Kingdom ............... 03410/79

[51] Int. Cl.$^3$ ............................ C01F 7/06; C01F 7/46
[52] U.S. Cl. .................... 423/130; 423/121; 423/127; 23/301; 23/302 T
[58] Field of Search ............... 423/119, 121, 130, 600, 423/111; 23/301, 302 T

[56] References Cited

U.S. PATENT DOCUMENTS

| 3,337,305 | 8/1967 | Byrns | 423/121 |
| 3,457,032 | 7/1969 | Buteque | 423/112 |
| 3,899,571 | 8/1975 | Yamada et al. | 423/130 |
| 4,038,039 | 7/1977 | Carruthers | 423/121 |
| 4,046,855 | 9/1977 | Schepers et al. | 423/121 |
| 4,101,629 | 7/1978 | Mercier et al. | 423/121 |

FOREIGN PATENT DOCUMENTS 207884 12/1967 U.S.S.R. .................. 423/600

Primary Examiner—Herbert T. Carter
Attorney, Agent, or Firm—Cooper, Dunham, Clark, Griffin & Moran

[57] ABSTRACT

Sodium oxalate is supersaturated solution in Bayer spent liquor stabilized by the presence of humic material is precipitated by the treatment with an adsorbent which adsorbs the humic material to give an insoluble product, thus removing it from solution and destabilizing the solution with respect to precipitation of sodium oxalate. The preferred adsorbent is activated carbon. The activated carbon can be dispersed in the spent liquor as a fine powder or the spent liquor can be passed through a column of particulate carbon. Precipitation of sodium oxalate can be expidited by addition to seed crystals and/or addition of sodium oxalate solution which is supersaturated at a temperature higher than that of the spent liquor.

15 Claims, 2 Drawing Figures

REMOVAL OF OXALATE FROM BAYER PROCESS LIQUOR

The present invention relates to improvements in the Bayer process for the manufacture of alumina (as trihydrate) from bauxite ores. In particular the invention is directed to the removal of oxalate, generally as the disodium salt, from Bayer process liquor.

Bauxites as mined usually contain from 0.1 to 0.3% by weight of organic carbon, but occasionally organic carbon contents of up to 0.6% are found when surface bauxites are mined. It is generally believed that the organic carbon is present in the form of humic substances. Typically, on digestion of the bauxite during the Bayer process more than half of this organic carbon is extracted into the liquor. With recycling of the Bayer liquor the concentration of these humic substances and their degradation products builds up an equilibrium concentration depending on the amount of organic carbon present in the bauxite and the organic carbon losses during the processing. The accumulated humic matter and its breakdown products are known to cause numerous process problems.

There are other possible sources of organic carbon in Bayer liquor. Examples include organic compounds added as flocculating agents and anti-foaming agents. However, such compounds represent only a small proportion of the total organic carbon in recycled Bayer liquor and we do not believe that these compounds or their breakdown products contribute significantly to the problems which arise from the presence of organic carbon in the bauxite.

It will be appreciated that in Bayer liquor, which is strongly alkaline, any acidic materials will be present chiefly in the form of salts with metal ions present (chiefly $Na^{30}$). Reference to acids in the Bayer liquor should be understood as referring to their salts, especially sodium salts, as appropriate.

The presence of such organic materials in bauxite gives rise to sodium oxalate in the Bayer liquor. The concentration of oxalate can build up sufficiently to precipitate crystalline sodium oxalate from the liquor. This can give rise to various process problems and it is desirable to remove sodium oxalate from the Bayer process to prevent its precipitation. Previously described attempts to effect this include U.S. Pat. No. 3,337,305 which describes a method in which sodium oxalate and other salts such as vanadate and carbonate is precipitated from solution by the addition of aqueous ammonia, typically in an amount of more than 10% and up to 30% by weight of the Bayer liquor. In U.S. Pat. No. 3,649,185 sodium oxalate precipitation is effected by raising the soda concentration by adding NaOH, thus reducing the solubility of the oxalate. U.S. Pat. No. 3,899,571 relates to a method in which seeding with activated crystals of sodium oxalate stimulates precipitation. Other processes which can generally be summarised as evaporative concentration followed by salting out are historically well known to those skilled in the art and, indeed are still practised as a way of removing excess $Na_2CO_3$. Such methods are less readily applicable to removal of oxalate and are relatively expensive, producing an impure product.

U.S. Pat. No. 3,457,032 describes a rather different approach to removal of impurities. The method involves passing the Bayer liquor through a bed of a strongly basic anion exchange resin to eliminate anions containing iron, silicon, titanium or zinc. It is mentioned that the process can also eliminate the organic impurities from the liquor. However, although the invention includes the possibility of regenerating spent anion exchange resin, the elimination of the organic impurities by this method is expensive. It is not directed towards the selective removal of sodium oxalate.

The organic material present in bauxite is generally of relatively high molecular weight, i.e. greater than 500, as estimated by ultrafiltration. This material and its initial degradation products (of similarly high molecular weight) constitute what we refer to herein as the "humic matter" present in the Bayer liquor. The humic matter in the liquor is a highly coloured anionic polyelectrolyte.

Under the hot, highly alkaline conditions of the Bayer process the humic matter is gradually decomposed eventually to low molecular weight compounds. We believe that the decomposition proceeds through intermediate degradation products comprising mainly benzene carboxylic acids and phenolic acids, presumably as the respective sodium salts. The bulk of eventual degradation products are low molecular weight carboxylic acids, principally formic, acetic and oxalic acids as their sodium salts. Sodium oxalate gives rise to problems in the Bayer process because of its limited solubility in the caustic Bayer liquor. When it comes out of solution the sodium oxalate forms a fine crystalline precipitate which can interfere with alumina trihydrate precipitation in the Bayer process.

The humic matter has an indirect effect in that it inhibits the precipitation of sodium oxalate from supersaturated solution in the Bayer liquor. Substantial concentrations of sodium oxalate in excess of saturation can be produced and although this delays the time at which problems with sodium oxalate precipitates start, the sudden crystallisation of the excess sodium oxalate can give rise to even greater problems. The precipitation inhibiting effect of the humic matter makes it difficult to control the concentration and undesirable precipitation of sodium oxalate.

The present invention is based on the surprising discovery that precipitation of sodium oxalate from supersaturated Bayer liquors can be stimulated by removing humic matter from the liquor. It is particularly surprising that removing only a small proportion of the humic matter can be highly effective in stimulating the precipitation of sodium oxalate. Typically the quantity of sodium oxalate precipitated may be several times as large as the amount of humic matter removed from the liquor.

The present invention accordingly comprises a method for controlling the level of sodium oxalate present in the process liquor in the Bayer process for the production of alumina trihydrate which method comprises the steps of treating spent liquor which contains in excess of 1 gram per liter (as organic carbon) of humic matter and is supersaturated with regard to sodium oxalate, with adsorbent in an amount to remove sufficient of the said humic matter but not more than 0.5 gram per liter from the said liquor and thereby destabilizing the said liquor with regard to precipitation of sodium oxalate, holding the said liquor to allow precipitation of sodium oxalate, separating the precipitated sodium oxalate and spent adsorbent and returning the said liquor to the Bayer process.

The adsorbents which can be used include activated alumina and activated clays, however, we have found that activated carbon is a particularly effective adsorbent. Accordingly, in a particular aspect, the present invention is directed to the use of activated carbon as the adsorbent and the invention will be particularly described with reference to the use of activated carbon as the adsorbent.

The present invention is applied to "spent Bayer liquor" by which term we mean Bayer liquor from which alumina trihydrate has been precipitated and separated. Because spent Bayer liquor is highly alkaline and contains appreciable quantities of aluminium as dissolved aluminate, it is recycled to the bauxite digestion stage of the Bayer process. It is common practice to remove excessive levels of inorganic salts, especially sodium carbonate, from the Bayer process circuit at the spent liquor stage by treatment of all or part of the liquor. Such treatments can be combined with the method of the present invention which itself may be applied to all or part of the spent liquor as appropriate in the particular operating conditions.

Activated carbon is described as a macroscopically amorphous form of carbon having a very large specific surface area ranging from about 300 to 2000 square meters per gram and having a highly developed internal pore structure. Activated carbons can be produced by the high temperature partial oxidation of carbonaceous materials such as lignite, coal, bone char and vegetable matter. Generally the carbonaceous starting material is charred by calcination and is then activated by heating with steam, carbon dioxide or air. So-called "activated charcoal" is widely used as a decolourising material in organic chemistry and is an example of an activated carbon which can be used in the present invention.

Activated carbons are generally available either as finely divided powders, as is common with "activated charcoal" used in synthetic methods, or in pelleted or beaded form. Either form may be used in the present invention but, as is described in more detail below, the particular forms of activated carbon are each especially applicable to different embodiments of the invention.

The amount of adsorbent used in contact with the Bayer liquor depends on the amount of humic matter and sodium oxalate in solution in the liquor. The greater the degree of supersaturation with sodium oxalate the less humic matter need be removed to initiate oxalate precipitation. The invention is directed to partial removal of the humic matter thus destabilizing the sodium oxalate in supersaturated solution causing it to precipitate. The solubility of sodium oxalate in Bayer liquor is directly related to temperature and inversely related to caustic soda concentration. (Conventionally caustic soda concentrations are expressed as sodium carbonate equivalent). Thus, at 50° C. the solubility of sodium oxalate is between 2 and 2.5 gpl, usually between 2.1 and 2.3 gpl at caustic soda concentrations of 160 to 190 gpl and between 1.5 and 2 gpl at caustic soda concentrations of 200 to 220 gpl. The concentrations of supersaturated oxalate liquors specifically referred to below relate to Bayer liquor having a caustic soda concentration of from 160 to 190 gpl. Minor adjustments can readily be made where different caustic soda concentrations, and therefore different degrees of supersaturation (for any particular absolute concentration of oxalate) of oxalate in the liquor, are used.

Generally the amount of adsorbent added will be just sufficient to initiate an adequate degree of precipitation of oxalate. For the treatment of typical Bayer liquors where the concentration of sodium oxalate is greater than the saturation value but less than that at which precipitation occurs despite the stabilizing effect of the humic matter, with activated carbon the amount used will be up to 1 gram per liter (gpl), more usually from 0.2 to 0.8 gpl. These figures relate specifically to oxalate concentrations between 4 and 6 gpl. Higher oxalate concentrations will need smaller amounts of carbon.

After contacting the Bayer liquor with the adsorbent, thus removing sufficient humic matter to destabilize the sodium oxalate in solution, the liquor is held to allow precipitation of the oxalate. Especially where the degree of supersaturation of sodium oxalate in the liquor is low, e.g. at concentrations between 3 and 4 gpl, it may be desirable to add sodium oxalate seed in an amount of from 0.2 to 1.0 gpl to the treated liquor to speed up precipitation. The driving force behind oxalate precipitation from solutions of low degrees of supersaturation can be increased by adding to the treated liquor a solution of sodium oxalate which is supersaturated at a temperature higher than that of the liquor, thus increasing the oxalate concentration in the liquor. Conventional flocculating agents may also be added to enable better separation of the precipitated oxalate, especially by stimulating more rapid settling of the solid oxalate. Typically, the treated liquor will precipitate oxalate in a period of from ½ to 10 hours after treatment depending mainly on the degree of supersaturation of the oxalate solution, the higher the degree of supersaturation the shorter the time. With the use of seed and/or additional oxalate solution as described above even liquors having a low degree of supersaturation e.g. 3 to 4 gpl total oxalate will usually precipitate the excess oxalate in from 2 to 4 hours. The precipitated oxalate can be separated from the liquor by any convenient means e.g. filtration, centrifugation or settling. It is usually desirable to agitate e.g. by stirring the destabilized liquor to encourage rapid completion of oxalate precipitation. The liquor from which excess oxalate has been precipitated can be returned to the Bayer process cycle.

The Bayer liquor treated in this invention is the "spent" liquor from the alumina trihydrate precipitation stage. Alumina trihydrate precipitation is usually carried out at a temperature between 50° and 70° C., commonly at about 65° C. The spent liquor is naturally at approximately or slightly below the temperature used for alumina precipitation. We have found that the treatment to remove part of the humic matter can conveniently be carried out at such temperatures especially from 55° to 65° C.

There are several different techniques by which the Bayer liquor can be treated to remove part of the humic matter. The simplest is where the humic matter is removed from solution as a solid phase in combination with the adsorbent carbon. The solid phase product can simply be separated with the precipitated sodium oxalate. This technique although simple, results in sodium oxalate contaminated with the spent adsorbent. Thus, especially where it is desirable to obtain a relatively pure oxalate as a by-product, it may be convenient to remove the spent adsorbent prior to precipitation of the oxalate. This can be effected by conventional means, e.g. filtration, centrifugation or settling. Of course, where the liquor is highly supersaturated with oxalate, precipitation may be triggered very rapidly after contact with the adsorbent and, accordingly, it may be difficult to remove the spent adsorbent before oxalate precipitation starts. Delaying adding seed or the additional oxalate solution may postpone the start of precipitation slightly and may thus enable the spent adsorbent to be removed prior to oxalate precipitation. However, where oxalate precipitation is very rapid, precipitation of oxalate is probably close even in the liquor stabilized by the humic matter. In such circumstances it is more important to remove oxalate from the liquor than to be too concerned over the purity of the oxalate separated.

In these techniques the adsorbent will usually be added in a suitable amount to the liquor in a vessel. To obtain uniform removal of the humic matter the adsorbent is preferably finely divided. Activated carbon is readily available in a highly divided form, e.g. greater than 90%, −325 mesh (Tyler standard sieve series) as in "activated charcoal". It is also desirable to disperse the activated carbon in the liquor and this can conveniently be achieved by stirring or air agitation.

Activated carbon is available commercially in particulate and pellet, as well as powder, form, and this form of activated carbon is appropriate for use in columns for continuous or semi-continuous partial removal of humic matter. Generally the particulate activated carbon will have an average particle size in the range 0.5 to 20 mm, more usually 1 to 5 mm. Columns of particulate activated carbon can be used in semi-continuous modes of operation by periodic regeneration of the activated carbon in the column. This involves taking the column out of use for the regeneration period, hence the description "semi-continuous". Functional continuity can be effected by having a number of columns in parallel operating at varying phases of the treatment/regeneration cycle. Fully continuous modes of operation can be achieved, using such columns, by recycling part of the material of the column through a regeneration plant.

The treatment in the regeneration plant will depend on the nature of the adsorbent. Thus, spent activated carbon can conveniently be reactivated by heating it at 500°–550° C. for one to two hours. The organics char to give free carbon and the organic soda can be recovered. Similarly, where the spent carbon in a batch method is separated prior to precipitation of the oxalate it may be regenerated. However, in the batch method it is not usually economically attractive to recover the small quantities of carbon used. The added complexity of recovery will not usually be compensated by the relatively small reduction in cost made possible by recovery.

Further details of specific processes for operating the invention are discussed in more detail below, especially with reference to the drawings in which.

Figure 1:
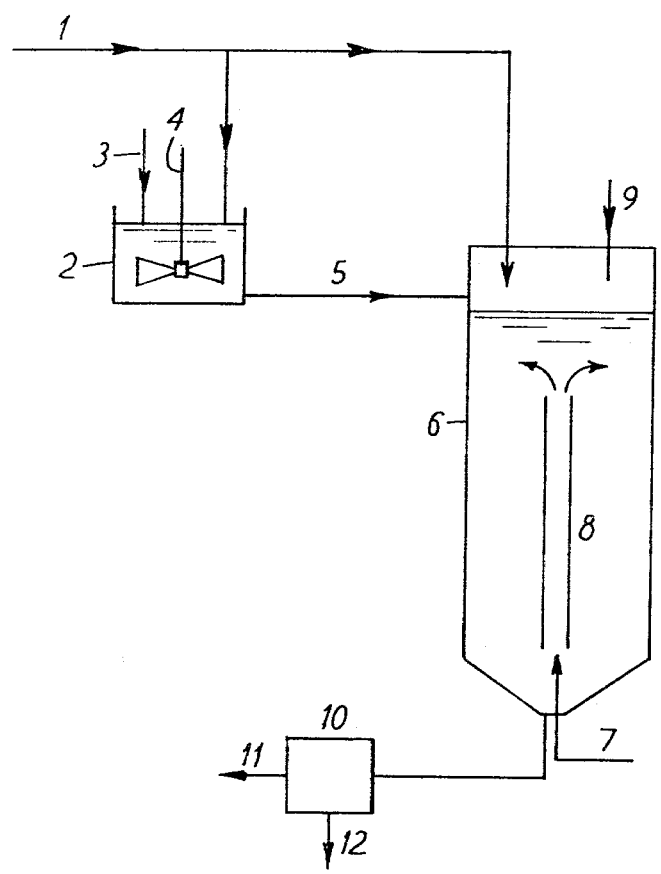
FIG. 1 is a flow diagram illustrating an embodiment of the invention.

In FIG. 1 a small proportion of a spent Bayer liquor stream 1 is fed into vessel 2. An appropriate amount of adsorbent, e.g. finely divided activated carbon 3 is added to the liquor and the mixture stirred by stirrer 4. The mixture of Bayer liquor and activated carbon in suspension 5 is passed to precipitation vessel 6 where it is combined with the remainder of the Bayer liquor 1. The precipitation vessel 6 is equipped with an air agitator comprising air supply 7 and pipe 8 and flocculating agents and/or settling agents 9 may also be added. The liquor is held in the precipitation vessel for a time sufficient to precipitate the excess dissolved oxalate. The slurry of precipitated oxalate in the liquor is then passed to filter 10. The clarified treatment liquor 11 is returned to the Bayer process circuit. The separated precipitated oxalate 12 is available as a by-product. A portion of the solid oxalate may be returned to the precipitation vessel 6 to act as seed crystals in a subsequent precipitation. Alternatively, a portion of the unfiltered slurry can be used as a source of seed crystals.

Figure 2:
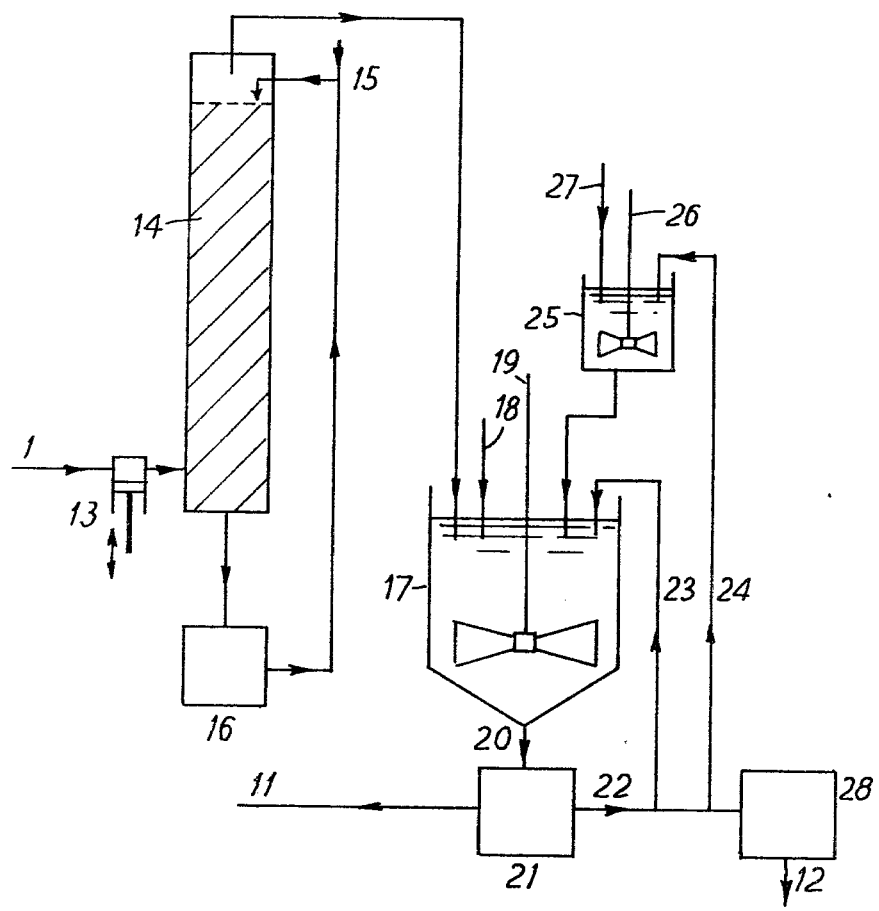
FIG. 2 is a flow diagram illustrating an embodiment of the invention which can operate continuously.

FIG. 2 illustrates an embodiment in which the oxalate removal process is operated continuously. In this embodiment spent Bayer liquor 1 is pumped through a column 14 of particulate adsorbent, e.g. activated carbon to remove a part of the humic matter therefrom and is subsequently passed to a precipitation vessel 17. The liquor is pumped into the column by reciprocating pump 13 and the resulting pulsations in pressure in the column serve to additional purpose of fluidising or partially fluidising the column of particulate adsorbent. Spent adsorbent is removed from the base of the column and is passed by way of regeneration plant 16 to the top of the column. The function of such regeneration plant has been described above. Fresh adsorbent 15 may also be added to the top of the column.

After passage through the column the treated Bayer liquor is passed to precipitation vessel 17 which is equipped with stirrer 19. Flocculating agents and/or settling agents 18 may also be added.

After appropriate residence in the precipitation vessel 17 the slurry of liquor and solid oxalate is passed to a series of settling tanks 21. The settling tanks 21 operate conventionally and the clarified liquor 11 is returned to the process circuit, optionally after additional clarification (not illustrated) from one end of the series and the oxalate by-product 22 is obtained from the other as a concentrated slurry. The concentrated slurry can be dewatered to give solid oxalate 12 by filter 28. A portion 23 of the slurry 22 may be returned to the precipitation vessel 17 as seed. A further portion 24 of the slurry 22 (and/or of the solid oxalate 12) may be passed to a vessel 25 equipped with stirrer 26. In this vessel a solution of oxalate in water 27 is prepared which is saturated with respect to oxalate at a temperature $T_1$. This solution is added to the liquor in the precipitation vessel which is at temperature $T_2$. $T_1$ is a higher temperature than $T_2$ and is chosen so that the solution added to the precipitation vessel increases the degree of supersaturation in the precipitation vessel which is at temperature $T_2$. Typically, where $T_2$ is about 60° C., $T_1$ will generally be between 75° and 95° C.

As those skilled in the art will appreciate, the settling tank 21 could be substituted for the filter 10 in FIG. 1 or by a suitable filter in FIG. 2. Further, the column of particulate adsorbent could be regenerated periodically after removing it from the circuit. Also the use of a solution of higher oxalate concentration can be used in the embodiment of FIG. 1 or omitted from the embodiment of FIG. 2.

The invention is further illustrated by the following Examples.

EXAMPLE 1

Bulk samples of spent Bayer liquor having a temperature of from 55° to 60° C. and containing more than 4.5 g/l of oxalate were treated to remove oxalate therefrom in apparatus as illustrated in FIG. 1. Batches of $8.5 \times 10^5$ l each were treated of which 5000 l were mixed with activated carbon and then this mixture was combined with the rest of the spent liquor in the precipitation vessel (reference numeral 6 in FIG. 1). The amount of carbon used was from 0.25 to 0.5 g/l of the total spent liquor (i.e. 212.5 kg to 425 kg per batch). The treated liquor was mixed by air agitation for a period of 8 hours and was thereafter filtered to remove the spent carbon and precipitated oxalate. After filtration the concentration of oxalate in the spent liquor was typically ca. 2.5 g/l indicating that treatment with as little as 0.25 g/l of activated carbon can precipitate 2.0 g/l or more of sodium oxalate.

EXAMPLE 2

This Example illustrates the operation of a column of particulate activated carbon.

A small scale column 7.5 cm (3 in.) diameter and 1.8 m (6 ft.) high was packed with granular activated carbon having a particle size $-8+30$ mesh (U.S. standard), a specific surface area of ca. 600 m$^2$/g and a bulk density of ca. 0.35 g/cm$^3$ (22 lb/ft$^3$) to a height of 1.35 m (4.5 ft.). Clarified spent Bayer liquor at about 70° C. (160° F.) was pumped through this column by a reciprocating pump (ca. 100 pulses/min) at a rate of 0.56 l/min. In operation the columnar bed of granular carbon expanded by about 20% to a height of ca. 1.65 m (5.5 ft) and a pulse height of about 6.5 mm (0.25 in). The treated liquor was passed to a pilot plant precipitator and after 200 liters had been collected the column was stopped and the liquor in the precipitator seeded with 0.25 g/l sodium oxalate crystals and mixed overnight at 54° C. (130° F.) by an air sparger. After 15 hours of mixing the oxalate concentration in the liquor had dropped from the original 4.6 g/l to 2.2 g/l Na$_2$C$_2$O$_4$.

The procedure was repeated through the same column for a further 250 liters of process liquor. The concentration of oxalate in the liquor after precipitation was 3.5 g/l indicating progressive exhaustion of the carbon bed. By periodically or continuously removing carbon from the base of the column and regenerating it, e.g. by heating to 500°-550° C. to char the organic part of the humic matter to free carbon, and returning the regenerated carbon to the top of the column with fresh carbon as necessary the column can be made to operate continuously.

What is claimed is:

1. A method for controlling the level of sodium oxalate present in the process liquor in the Bayer process for the production of alumina trihydrate which method comprises the steps of treating spent liquor which contains in excess of 1 gram per liter (as organic carbon) of humic matter and is supersaturated with regard to sodium oxalate, with adsorbent material selected from the class consisting of activated carbon, activated alumina and activated clays, in an amount to remove sufficient of the said humic matter but not more than 0.5 gram per liter from the said liquor and thereby destabilizing the said liquor with regard to precipitation of sodium oxalate, holding the said liquor to allow precipitatiion of sodium oxalate, separating the precipitated sodium oxalate and spent adsorbent and returning the said liquor to the Bayer process.

2. A method as claimed in claim 1 wherein the adsorbent is activated carbon.

3. A method as claimed in claim 2 wherein the activated carbon is in the form of a powder at least 90% having a particle size less than 325 mesh Tyler.

4. A method as claimed in claim 2 wherein the amount of activated carbon used is from 0.2 to 0.8 grams per liter of the Bayer spent liquor.

5. A method as claimed in claim 1 wherein from 0.2 to 1 gram per liter of solid sodium oxalate is added to the treated liquor as seed to speed up precipitation of the solid sodium oxalate.

6. A method as claimed in claim 5 wherein the solid sodium oxalate used as seed is sodium oxalate precipitated from spent liquor by the method of claim 1.

7. A method as claimed in claim 1 wherein the temperature at which the spent liquor is treated is from 55° to 65° C.

8. A method as claimed in claim 1 wherein, prior to precipitation of the sodium oxalate from the spent liquor, a solution of sodium oxalate, which is supersaturated at a temperature higher than that of the spent liquor, is added to the spent liquor.

9. A method as claimed in claim 8 wherein the temperature at which the said solution is saturated is from 75° to 95° C.

10. A method as claimed in claim 1 wherein the adsorbent and adsorped humic material is separated from the treated spent liquor to precipitation of the sodium oxalate.

11. A method as claimed in claim 1 wherein the treated spent liquor is held for from 0.5 to 10 hours to allow precipitation of the sodium oxalate.

12. A method as claimed in claim 1 wherein the spent liquor is passed through a column of particulate adsorbent to effect the partial removal of humic matter from the spent liquor.

13. A method as claimed in claim 12 wherein the adsorbent is particulate activated carbon having an average particle size in the range from 1 to 5 mm.

14. A method as claimed in claim 12 wherein when the carbon in the column is saturated with humic material it is removed from the column and regenerated prior to re-use in the column.

15. A method as claimed in claim 12 wherein the spent liquor is continuously passed through the column and spent adsorbent is removed from the base of the column, is regenerated and subsequently added to the top of the column thereby effecting continuous operation.

* * * * *

UNITED STATES PATENT AND TRADEMARK OFFICE
CERTIFICATE OF CORRECTION

PATENT NO. : 4,275,043
DATED : June 23, 1981
INVENTOR(S) : BOHDAN GNYRA

It is certified that error appears in the above-identified patent and that said Letters Patent are hereby corrected as shown below:

On the title page
Abstract, line 1, change "is" to read -- in --.

Abstract, line 11, change "to" to read -- of --.

Column 1, line 37, change "$Na^{30}$" to read -- $Na^+$ --.

Column 6, line 13, change "to" to read -- the --.

Column 7, line 53 (Claim 1), change "precipitatiion" to read -- precipitation --.

Column 8, line 32 (Claim 10), after "liquor" and before "to" insert -- prior --.

Signed and Sealed this

Thirteenth Day of April 1982

[SEAL]

Attest:

GERALD J. MOSSINGHOFF

Attesting Officer — Commissioner of Patents and Trademarks